(12) United States Patent
Petre et al.

(10) Patent No.: US 12,566,244 B1
(45) Date of Patent: Mar. 3, 2026

(54) SYSTEM AND METHOD FOR REAL-TIME RADAR RANGE-DOPPLER MAP LEARNING

(71) Applicant: HRL Laboratories, LLC, Malibu, CA (US)

(72) Inventors: Peter Petre, Oceanside, CA (US); Amir M. Rahimi, Santa Monica, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 92 days.

(21) Appl. No.: 18/525,516

(22) Filed: Nov. 30, 2023

Related U.S. Application Data

(63) Continuation-in-part of application No. 17/375,655, filed on Jul. 14, 2021, and a continuation-in-part of application No. 17/375,724, filed on Jul. 14, 2021, now Pat. No. 11,863,221, and a continuation-in-part of application No. 17/369,742, filed on Jul. 7, 2021.

(Continued)

(51) Int. Cl.
*G01S 7/288* (2006.01)
*G01S 13/89* (2006.01)

(52) U.S. Cl.
CPC ............ *G01S 7/2886* (2021.05); *G01S 13/89* (2013.01)

(58) Field of Classification Search
CPC ............................... G01S 7/2886; G01S 13/89
See application file for complete search history.

(56) References Cited

U.S. PATENT DOCUMENTS 5,694,474 A * 12/1997 Ngo ................... H03H 21/0012
381/94.1
7,474,756 B2 * 1/2009 Rickard .............. G06F 18/2134
702/194

(Continued)

FOREIGN PATENT DOCUMENTS

CN 1928500 A * 3/2007 ........... G01D 5/2073
CN 1640084 B * 10/2014 ............... H03C 1/36
(Continued)

OTHER PUBLICATIONS

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

(Continued)

*Primary Examiner* — Berhanu Tadese
(74) *Attorney, Agent, or Firm* — TOPE-MCKAY & ASSOCIATES

(57) ABSTRACT
Described is a system for real-time radar range-doppler map learning. The system includes a physics enhanced dynamic reservoir core operable for receiving as an input signal a time delayed copy of a transmitted complex in-phase and quadrature (I/Q) radar waveform and mapping the input signal onto a neural network to determine complex-valued output weights of neural states of the neural network. An online learning layer is included that adapts the complex-valued output weights of the neural states to predict a most likely next value of the input signal. A neural combiner is used to combine a set of delayed neural state vectors with the complex-valued output weights of the online learning layer to compute a denoised and decluttered output signal.

12 Claims, 6 Drawing Sheets

Related U.S. Application Data

(60) Provisional application No. 63/051,877, filed on Jul. 14, 2020, provisional application No. 63/051,851, filed on Jul. 14, 2020, provisional application No. 63/051,763, filed on Jul. 14, 2020, provisional application No. 63/051,368, filed on Jul. 13, 2020.

(56) References Cited

U.S. PATENT DOCUMENTS

| | | | | |
|---|---|---|---|---|
| 7,587,064 | B2 * | 9/2009 | Owechko | G06V 10/426 |
| | | | | 382/103 |
| 7,720,268 | B2 * | 5/2010 | Slabaugh | G06T 7/12 |
| | | | | 382/128 |
| 8,031,117 | B2 * | 10/2011 | Goldberg | H04B 7/10 |
| | | | | 342/377 |
| 8,515,160 | B1 * | 8/2013 | Khosla | G06V 10/255 |
| | | | | 382/156 |
| 9,042,496 | B1 * | 5/2015 | Su | H04L 27/0012 |
| | | | | 375/346 |
| 9,349,092 | B2 * | 5/2016 | Thibeault | G06N 3/0499 |
| 9,515,789 | B2 * | 12/2016 | Zhang | H04L 27/26538 |
| 9,566,174 | B1 * | 2/2017 | De Sapio | A61F 2/54 |
| 9,581,681 | B2 * | 2/2017 | Lynch | G01S 7/02 |
| 9,646,248 | B1 * | 5/2017 | Benvenuto | G06N 5/022 |
| 9,749,007 | B1 * | 8/2017 | Martin | H04B 1/719 |
| 9,753,959 | B2 * | 9/2017 | Birdwell | G06N 3/049 |
| 9,798,751 | B2 * | 10/2017 | Birdwell | G06N 3/02 |
| 9,954,561 | B2 * | 4/2018 | Ray | H04B 1/1638 |
| 10,003,483 | B1 | 6/2018 | Migliori | |
| 10,019,470 | B2 * | 7/2018 | Birdwell | G06N 3/10 |
| 10,055,434 | B2 * | 8/2018 | Birdwell | G06N 3/065 |
| 10,095,718 | B2 * | 10/2018 | Birdwell | G06N 3/0442 |
| 10,128,820 | B2 * | 11/2018 | Petre | G06N 3/065 |
| 10,153,806 | B1 * | 12/2018 | Petre | H04B 1/719 |
| 10,162,378 | B1 * | 12/2018 | Rao | G06F 18/2134 |
| 10,181,100 | B1 * | 1/2019 | Benvenuto | G06N 3/09 |
| 10,192,099 | B2 * | 1/2019 | Agaian | A61B 5/725 |
| 10,198,691 | B2 * | 2/2019 | Nino | G06N 3/049 |
| 10,211,856 | B1 | 2/2019 | Petre | |
| 10,217,047 | B2 * | 2/2019 | O'Shea | G06N 3/08 |
| 10,248,675 | B2 * | 4/2019 | Birdwell | G06N 3/0985 |
| 10,291,268 | B1 * | 5/2019 | Migliori | G06N 3/02 |
| 10,305,553 | B2 * | 5/2019 | O'Shea | G06N 3/09 |
| 10,310,074 | B1 * | 6/2019 | Ni | G01S 13/9019 |
| 10,324,167 | B2 * | 6/2019 | Ray | G01S 5/12 |
| 10,324,168 | B2 * | 6/2019 | Ray | G06F 16/29 |
| 10,341,669 | B2 * | 7/2019 | Lin | G06N 3/049 |
| 10,346,739 | B1 * | 7/2019 | Dockendorf | G06N 3/08 |
| 10,374,863 | B2 * | 8/2019 | Xu | H04L 27/362 |
| 10,380,062 | B1 * | 8/2019 | Rao | G06N 3/09 |
| 10,396,919 | B1 * | 8/2019 | O'Shea | G06N 20/00 |
| 10,397,039 | B2 * | 8/2019 | Zhang | H04W 72/21 |
| 10,404,299 | B1 * | 9/2019 | Petre | G06N 3/09 |
| 10,429,491 | B2 * | 10/2019 | Ray | G01S 7/021 |
| 10,484,043 | B1 * | 11/2019 | Martin | H04B 1/719 |
| 10,495,725 | B2 * | 12/2019 | Zhang | G01S 13/003 |
| 10,529,320 | B2 * | 1/2020 | Shafran | G10L 19/0212 |
| 10,541,765 | B1 * | 1/2020 | O'Shea | G06N 3/0455 |
| 10,546,233 | B1 * | 1/2020 | Bhattacharyya | G06N 3/063 |
| 10,572,830 | B2 * | 2/2020 | O'Shea | G06N 3/0464 |
| 10,614,358 | B2 * | 4/2020 | Nino | G06N 3/044 |
| 10,643,153 | B2 * | 5/2020 | O'Shea | G06N 3/082 |
| 10,671,912 | B2 * | 6/2020 | Gottfried | G06N 3/09 |
| 10,671,917 | B1 * | 6/2020 | Bhattacharyya | G06F 17/16 |
| 10,712,416 | B1 * | 7/2020 | Sandino | G06N 3/084 |
| 10,712,425 | B1 * | 7/2020 | Rao | G06N 3/047 |
| 10,720,949 | B1 * | 7/2020 | Rao | G06N 3/044 |
| 10,735,298 | B2 * | 8/2020 | Chen | A61B 5/7253 |
| 10,742,475 | B2 * | 8/2020 | Lai | H04L 25/0224 |
| 10,783,430 | B2 * | 9/2020 | Wittenberg | G01R 23/167 |
| 10,788,836 | B2 * | 9/2020 | Ebrahimi Afrouzi | |
| | | | | G05D 1/0214 |
| 10,789,479 | B2 * | 9/2020 | Carreira | G06F 18/251 |
| 10,832,168 | B2 * | 11/2020 | Krasser | G06N 3/09 |

| | | | | |
|---|---|---|---|---|
| 10,846,595 | B2 * | 11/2020 | Wild | G06N 3/088 |
| 10,878,276 | B2 * | 12/2020 | Martin | G06F 18/24 |
| 10,891,543 | B2 | 1/2021 | Hosokawa | |
| 10,892,806 | B2 * | 1/2021 | O'Shea | G06N 3/0442 |
| 10,921,422 | B2 * | 2/2021 | Smith | G01S 13/343 |
| 10,929,745 | B2 * | 2/2021 | Birdwell | G06N 3/09 |
| 10,951,982 | B2 * | 3/2021 | Hayakawa | H04R 29/005 |
| 10,976,429 | B1 * | 4/2021 | Jiang | G06N 3/0985 |
| 10,986,113 | B2 * | 4/2021 | De Sapio | G06N 3/049 |
| 11,002,819 | B2 * | 5/2021 | Wittenberg | G01S 13/878 |
| 11,032,014 | B2 * | 6/2021 | O'Shea | H04B 17/373 |
| 11,037,030 | B1 * | 6/2021 | Kolouri | G06N 3/048 |
| 11,037,057 | B1 * | 6/2021 | Virbila | G06N 5/022 |
| 11,055,614 | B2 * | 7/2021 | Nino | G06N 3/0495 |
| 11,062,489 | B2 * | 7/2021 | Chen | G06N 3/084 |
| 11,069,082 | B1 * | 7/2021 | Ebrahimi Afrouzi | H04N 23/56 |
| 11,150,327 | B1 * | 10/2021 | Jiang | G06N 3/049 |
| 11,153,503 | B1 * | 10/2021 | Ebrahimi Afrouzi | H04N 7/183 |
| 11,256,988 | B1 | 2/2022 | Guerci | |
| 11,270,198 | B2 * | 3/2022 | Busch | G06N 3/065 |
| 11,274,929 | B1 * | 3/2022 | Afrouzi | G06T 7/30 |
| 11,282,505 | B2 * | 3/2022 | Hayakawa | G10L 15/02 |
| 11,366,998 | B2 * | 6/2022 | Pugsley | G06N 3/088 |
| 11,366,999 | B2 * | 6/2022 | Yamamoto | G06N 3/08 |
| 11,381,286 | B2 * | 7/2022 | O'Shea | H04B 7/0452 |
| 11,391,830 | B2 * | 7/2022 | Au | H04W 48/16 |
| 11,392,689 | B2 * | 7/2022 | Nguyen | G06F 21/562 |
| 11,392,830 | B2 * | 7/2022 | Ozcan | G06F 18/214 |
| 11,403,479 | B2 * | 8/2022 | Cao | G06V 10/764 |
| 11,423,301 | B2 * | 8/2022 | O'Shea | G06N 3/0442 |
| 11,449,735 | B2 | 9/2022 | Chang | |
| 11,514,325 | B2 * | 11/2022 | Ozcan | G06V 20/69 |
| 11,521,053 | B2 * | 12/2022 | Stepp | G06N 3/065 |
| 11,521,075 | B2 * | 12/2022 | Clement | G06F 8/51 |
| 11,526,424 | B2 * | 12/2022 | Deng | G06F 21/577 |
| 11,531,639 | B2 * | 12/2022 | Petre | G06N 3/09 |
| 11,575,544 | B2 * | 2/2023 | Andrews | H04L 25/0254 |
| 11,580,381 | B2 * | 2/2023 | Daval Frerot | G06N 3/08 |
| 11,614,514 | B2 * | 3/2023 | Chen | G01S 13/584 |
| | | | | 342/70 |
| 11,625,557 | B2 * | 4/2023 | Hoffmann | G06N 3/0455 |
| | | | | 382/104 |
| 11,632,181 | B2 * | 4/2023 | O'Shea | G06N 3/09 |
| | | | | 706/12 |
| 11,638,160 | B2 * | 4/2023 | Montalvo | G06N 3/02 |
| | | | | 370/329 |
| 11,657,531 | B1 * | 5/2023 | Ebrahimi Afrouzi | G06V 10/44 |
| | | | | 382/284 |
| 11,770,286 | B2 * | 9/2023 | Timo | H04L 25/0254 |
| | | | | 375/262 |
| 11,783,196 | B2 * | 10/2023 | O'Shea | G06N 3/0455 |
| | | | | 706/12 |
| 11,832,110 | B2 * | 11/2023 | Montalvo | G06F 30/27 |
| 11,863,221 | B1 * | 1/2024 | Adl | H04B 1/123 |
| 11,868,882 | B2 * | 1/2024 | Pietquin | G06N 3/0499 |
| 12,057,989 | B1 * | 8/2024 | Adl | G06N 3/08 |
| 2005/0047611 | A1 * | 3/2005 | Mao | H04R 3/005 |
| | | | | 381/92 |
| 2010/0158271 | A1 * | 6/2010 | Park | H04R 3/005 |
| | | | | 381/94.7 |
| 2012/0232418 | A1 * | 9/2012 | Kimura | A61B 7/04 |
| | | | | 327/551 |
| 2014/0009224 | A1 | 1/2014 | van Zelm | |
| 2014/0233826 | A1 * | 8/2014 | Agaian | G06V 20/698 |
| | | | | 382/133 |
| 2014/0241211 | A1 | 8/2014 | Zhang | |
| 2015/0127150 | A1 | 5/2015 | Ponulak | |
| 2015/0302296 | A1 * | 10/2015 | Thibeault | G06N 3/0499 |
| | | | | 706/25 |
| 2016/0132768 | A1 * | 5/2016 | Ray | G06N 3/08 |
| | | | | 706/22 |
| 2016/0203827 | A1 * | 7/2016 | Leff | G10L 19/125 |
| | | | | 704/207 |
| 2018/0076795 | A1 * | 3/2018 | Petre | H04B 1/719 |
| 2018/0089558 | A1 | 3/2018 | Wittenberg | |
| 2018/0096246 | A1 * | 4/2018 | Yamamoto | G06N 3/09 |
| 2018/0174042 | A1 * | 6/2018 | Srinivasa | G06N 3/088 |
| 2018/0174053 | A1 * | 6/2018 | Lin | G06N 3/049 |

(56) References Cited

U.S. PATENT DOCUMENTS

| | | | | |
|---|---|---|---|---|
| 2018/0307935 | A1* | 10/2018 | Rao | G06V 10/764 |
| 2018/0308013 | A1* | 10/2018 | O'Shea | H04B 17/30 |
| 2018/0314985 | A1* | 11/2018 | O'Shea | G06N 3/09 |
| 2019/0042915 | A1* | 2/2019 | Akin | G06N 3/065 |
| 2019/0042916 | A1* | 2/2019 | Cao | G06N 3/092 |
| 2019/0042920 | A1* | 2/2019 | Akin | G06N 3/049 |
| 2019/0042942 | A1* | 2/2019 | Natroshvili | G06N 3/088 |
| 2019/0080210 | A1* | 3/2019 | Owechko | G06F 18/10 |
| 2019/0120932 | A1* | 4/2019 | Smith | G01S 7/2955 |
| 2019/0187245 | A1 | 6/2019 | Guarin Aristizabal | |
| 2019/0188565 | A1 | 6/2019 | O'Shea | |
| 2019/0205696 | A1* | 7/2019 | Owechko | G06F 18/2134 |
| 2019/0230107 | A1* | 7/2019 | De Sapio | H04L 63/145 |
| 2019/0248007 | A1 | 8/2019 | Duff | |
| 2019/0251421 | A1 | 8/2019 | Wang | |
| 2019/0324108 | A1* | 10/2019 | Wittenberg | G01S 13/003 |
| 2019/0349037 | A1 | 11/2019 | O'Shea | |
| 2020/0034331 | A1* | 1/2020 | Petre | G06N 3/09 |
| 2020/0042873 | A1 | 2/2020 | Daval Frerot | |
| 2020/0046240 | A1* | 2/2020 | Angle | A61B 5/291 |
| 2020/0066260 | A1* | 2/2020 | Hayakawa | G06N 3/0499 |
| 2020/0111483 | A1* | 4/2020 | Shafran | G06N 3/02 |
| 2020/0218941 | A1* | 7/2020 | Wang | G06F 18/2148 |
| 2020/0218959 | A1* | 7/2020 | Srinivasa | G06F 18/2413 |
| 2020/0218977 | A1* | 7/2020 | Paul | G06N 3/08 |
| 2020/0225317 | A1 | 7/2020 | Chen | |
| 2020/0265290 | A1* | 8/2020 | Paul | G06N 3/08 |
| 2020/0265338 | A1* | 8/2020 | O'Shea | G06N 3/082 |
| 2020/0272883 | A1* | 8/2020 | Cao | G06N 3/088 |
| 2020/0272884 | A1* | 8/2020 | Paul | G06N 3/049 |
| 2020/0292660 | A1* | 9/2020 | Meissner | G01S 7/023 |
| 2020/0327225 | A1* | 10/2020 | Nguyen | G06N 3/08 |
| 2020/0334575 | A1* | 10/2020 | O'Shea | H04W 24/08 |
| 2020/0341109 | A1* | 10/2020 | Meissner | G01S 13/02 |
| 2020/0342321 | A1* | 10/2020 | Paul | G06N 3/08 |
| 2020/0373950 | A1 | 11/2020 | Cai | |
| 2021/0049462 | A1* | 2/2021 | Okumura | G06N 3/09 |
| 2021/0093203 | A1* | 4/2021 | Zhong | A61B 5/05 |
| 2021/0125048 | A1 | 4/2021 | Jang | |
| 2021/0133468 | A1* | 5/2021 | Chen | G06V 20/597 |
| 2021/0146531 | A1* | 5/2021 | Tremblay | G06N 3/084 |
| 2021/0209453 | A1* | 7/2021 | Meissner | G06N 3/09 |
| 2021/0304736 | A1* | 9/2021 | Kothari | G06F 40/30 |
| 2021/0341436 | A1* | 11/2021 | Perdios | G06T 11/005 |
| 2021/0353439 | A1* | 11/2021 | Norman | A61F 2/70 |
| 2021/0357187 | A1* | 11/2021 | Clement | G06N 3/0895 |
| 2021/0357210 | A1* | 11/2021 | Clement | G06N 3/0895 |
| 2021/0357737 | A1* | 11/2021 | Hamerly | G06N 3/067 |
| 2021/0357742 | A1* | 11/2021 | Restuccia | H04L 27/34 |
| 2021/0367690 | A1* | 11/2021 | O'Shea | G06N 3/0895 |
| 2022/0012637 | A1* | 1/2022 | Rezazadegan Tavakoli | G06N 3/09 |
| 2022/0014398 | A1* | 1/2022 | Andrews | H04L 25/0254 |
| 2022/0055689 | A1* | 2/2022 | Mandlekar | B60W 60/0025 |
| 2022/0075605 | A1* | 3/2022 | Iyer | G06N 3/04 |
| 2022/0198245 | A1* | 6/2022 | Cleland | G06N 3/0495 |
| 2022/0200669 | A1 | 6/2022 | Banuli Nanje Gowda | |
| 2022/0217035 | A1* | 7/2022 | Melodia | G06N 3/08 |
| 2022/0222512 | A1* | 7/2022 | Virbila | G06N 3/044 |
| 2022/0222513 | A1* | 7/2022 | Paramasivam | G06N 3/0464 |
| 2022/0253674 | A1 | 8/2022 | Sakemi | |
| 2022/0278755 | A1 | 9/2022 | Lee | |
| 2022/0368583 | A1* | 11/2022 | Timo | G06N 3/09 |
| 2023/0109019 | A1* | 4/2023 | Petre | G06N 3/08 706/22 |
| 2023/0262470 | A1* | 8/2023 | Montalvo | G06N 20/20 370/329 |
| 2023/0316083 | A1* | 10/2023 | O'Shea | G06N 3/082 706/12 |
| 2023/0324501 | A1* | 10/2023 | Feigl | G01S 5/0273 342/451 |

FOREIGN PATENT DOCUMENTS

| | | | | |
|---|---|---|---|---|
| CN | 106875002 | A | 6/2017 | |
| CN | 105075156 | B | 1/2018 | |
| CN | 110088635 | A | 8/2019 | |
| CN | 110728324 | A | 1/2020 | |
| CN | 111541466 | B | 3/2021 | |
| CN | 110301143 | B | 4/2022 | |
| CN | 110088635 | B | 9/2022 | |
| DE | 102019106529 | A1 | 9/2020 | |
| DE | 102021132995 | A1 | 6/2022 | |
| EP | 3293681 | A1 * | 3/2018 | G06N 3/049 |
| EP | 2962416 | B1 * | 6/2018 | H04L 27/26538 |
| EP | 3561539 | A1 * | 10/2019 | G01S 7/352 |
| EP | 3660749 | A1 * | 6/2020 | G06N 3/088 |
| EP | 3695783 | A1 * | 8/2020 | G06V 20/56 |
| EP | 3612356 | B1 * | 6/2021 | G06N 3/0499 |
| EP | 3637099 | B1 * | 6/2021 | G06T 11/006 |
| EP | 3855388 | A1 * | 7/2021 | G06T 1/00 |
| EP | 3571862 | B1 * | 6/2022 | G06N 3/09 |
| EP | 3561539 | B1 * | 10/2022 | G01S 7/417 |
| JP | 2018077213 | A | 5/2018 | |
| JP | 2018091826 | A | 5/2018 | |
| JP | 2019090795 | A * | 6/2019 | G06F 18/24143 |
| JP | 6758524 | B2 | 9/2020 | |
| JP | 2020203075 | A * | 12/2020 | B60L 50/20 |
| JP | 7049085 | B2 | 4/2022 | |
| JP | 7163011 | B2 | 10/2022 | |
| KR | 20190046632 | A * | 5/2019 | G06N 3/044 |
| KR | 20200073027 | A * | 6/2020 | H10N 70/8416 |
| KR | 20210049462 | A * | 5/2021 | H01M 10/0585 |
| KR | 20210069655 | A * | 6/2021 | G01N 29/0654 |
| WO | WO-2014133506 | A1 * | 9/2014 | G06N 3/063 |
| WO | WO-2018136144 | A1 * | 7/2018 | G06N 3/065 |
| WO | WO-2018136785 | A1 * | 7/2018 | H04B 17/27 |
| WO | WO-2018200529 | A1 | 11/2018 | |
| WO | WO2018204632 | A1 | 11/2018 | |
| WO | WO2018236932 | A1 | 12/2018 | |
| WO | WO-2019002465 | A1 * | 1/2019 | G06N 3/08 |
| WO | WO-2019060730 | A1 * | 3/2019 | B25J 9/163 |
| WO | WO-2018136785 | A9 * | 8/2019 | H04B 17/26 |
| WO | WO-2019161076 | A1 * | 8/2019 | G01R 29/08 |
| WO | WO-2019200289 | A1 | 10/2019 | |
| WO | WO-2020074181 | A1 * | 4/2020 | G01N 29/4481 |
| WO | WO2020102204 | A1 | 5/2020 | |
| WO | WO-2020210673 | A1 * | 10/2020 | G06N 3/044 |
| WO | WO-2020231005 | A1 * | 11/2020 | G06T 1/00 |
| WO | WO-2020236236 | A2 | 12/2020 | |
| WO | WO-2020236236 | A3 | 12/2020 | |
| WO | WO-2020236236 | A9 | 2/2021 | |
| WO | WO-2021231609 | A1 * | 11/2021 | G06N 3/09 |

OTHER PUBLICATIONS

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

R. Legenstein, et al. "Edge of Chaos and Prediction of Computational Performance for Neural Microcircuit Models," Neural Networks, 20(3), pp. 323-334, 2007.

W. Maass, "Liquid Computing", Proc. of the Conference CiE'07 : Computability in Europe 2007, Siena (Italy), pp. 507-516.

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks, vol. 20, No. 3, Apr. 2007, pp. 391-403.

(56) References Cited

OTHER PUBLICATIONS

R. H. Walden, "Analog-to-digital converter survey and analysis," IEEE J. Sel. Areas Commun., vol. 51, pp. 539-548, 1999.

H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.

Office Action 1 for U.S. Appl. No. 15/817,906, Date mailed: Feb. 23, 2018.

Response to Office Action 1 for U.S. Appl. No. 15/817,906,, Date mailed: May 23, 2018.

Notice of Allowance for U.S. Appl. No. 15/817,906, Date mailed: Jul. 6, 2018.

Notification of Transmittal of International Search Report and the Written Opinion of the International Searching Authority for PCT/US2017/062561; date of mailing Feb. 6, 2018.

International Search Report of the International Searching Authority for PCT/US2017/062561; date of mailing Feb. 6, 2018.

Written Opinion of the International Searching Authority for PCT/US2017/062561; date of mailing Feb. 6, 2018.

Notification of International Preliminary Report on Patentability (Chapter I) for PCT/US2017/062561; date of mailing Aug. 1, 2019.

International Preliminary Report on Patentability (Chapter I) for PCT/US2017/062561; date of mailing Aug. 1, 2019.

M. Lukosevicius, H. Jaeger: "Reservoir computing approaches to recurrent neural network training", Computer Science Review (2009), Computer Science Review 3 ( 2009 ) pp. 127-149.

Jing Dai, et al.: "An Introduction to the Echo State Network and its Applications in Power System", 2009 15th International Conference on Intelligent System Applications to Power Systems, IEEE, pp. 1-7.

Pathak et al., entitled, "Hybrid forecasting of chaotic processes: Using machine learning in conjunction with a knowledge-based model," arXiv:1803.04779, 2018, pp. 1-9.

Office Action 1 for Chinese Patent Application No. 201780078246. 2, Dated: Dec. 3, 2020.

English translation of Office Action 1 for Chinese Patent Application No. 201780078246.2, Date mailed: Dec. 3, 2020.

Andrius Petrenas, "Reservoir Computing for Extraction of Low Amplitude Atrial Activity in Atrial Fibrillation", Computing in Cardiology(CINC), pp. 13-16.

Response to Office Action 1 for Chinese Patent Application No. 201780078246.2, Date filed Apr. 14, 2021.

English translation of amended claims in Response to Office Action 1 for Chinese Patent Application No. 201780078246.2, Date filed Apr. 14, 2021.

Office Action 2 for Chinese Patent Application No. 201780078246. 2, Dated: Jul. 21, 2021.

English translation of Office Action 2 for Chinese Patent Application No. 201780078246.2, Date mailed: Jul. 21, 2021.

Response to Office Action 2 for Chinese Patent Application No. 201780078246.2, Date filed Sep. 13, 2021.

English translation of amended claims in Response to Office Action 2 for Chinese Patent Application No. 201780078246.2, Date filed Sep. 13, 2021.

Decision of Rejection for Chinese Patent Application No. 201780078246.2, Dated: Jan. 4, 2022.

Request for Reexamination for Chinese Patent Application No. 201780078246.2, Filed Mar. 30, 2022.

English translation of amended claims in Request for Reexamination for Chinese Patent Application No. 201780078246.2, Date filed Mar. 30, 2022.

Reexamination Decision for Chinese Patent Application No. 201780078246.2, Dated May 6, 2022.

Amendment for Chinese Patent Application. No. 201780078246.2, Dated Jun. 20, 2022.

English translation of amended claims in Amendment for Chinese Patent Application No. 201780078246.2, Date filed Jun. 20, 2022.

Notice of Allowance for Chinese Patent Application No. 201780078246. 2, Date filed Jul. 5, 2022.

English translation of Notice of Allowance for Chinese Patent Application No. 201780078246.2, Date filed Jul. 5, 2022.

Patent Certificate for Chinese Patent No. CN 110088635 B, Dated Sep. 20, 2022.

English translation of the Patent Certificate for Chinese Patent No. CN 110088635 B, Dated Sep. 20, 2022.

Communication pursuant to Rules 161(2) and 162 EPC for European Regional Phase Patent Application No. 17892664.8, dated Aug. 27, 2019.

Response to the communication pursuant to Rules 161(2) and 162 EPC for European Regional Phase Patent Application No. 17892664. 8, dated Mar. 6, 2020.

Communication pursuant to Rules 70(2) and 70a(2) EPC (the supplementary European search report) for the European Regional Phase Patent Application No. 17892664.8, dated Oct. 22, 2020.

Andrius Petrenas, et al., "Reservoir computing for extraction of low amplitude atrial activity in atrial fibrillation," Computing in Cardiology (CINC). 2012. IEEE. Sep. 9, 2012 (Sep. 9, 2012). pp. 13-16. XP032317043. ISBN: 978-1-4673-2076-4.

Ali Deihimi, et al., "Application of echo state network for harmonic detection in distribution networks," IET Generation. Transmission &Distribution. vol. 11. No. 5. Dec. 21, 2016 (Dec. 21, 2016). pp. 1094-1101. XP055733455.

Herbert Jaeger, "Controlling Recurrent Neural Networks by Conceptors," Technical Report No. 31, Jul. 22, 2016 (Jul. 22, 2016). XP055732541, Retrieved from the Internet: URL:https:jjarxiv. orgjpdf/1403.3369v2.pdf [retrieved on Sep. 21, 2020].

Ozturk, et al, "An associative memory readout for ESNs with applications to dynamical pattern recognition," Neural Networks. Elsevier Science Publishers. Barking. GB. vol. 20. No. 3. Jun. 5, 2007 (Jun. 5, 2007). pp. 377-390. XP022104570.

Response to the communication pursuant to Rules 70(2) and 70a (2) EPC (the supplementary European search report) for the European Regional Phase Patent Application No. 17892664.8, dated Apr. 22, 2021.

Office Action 1 for U.S. Appl. No. 17/375,724, Date mailed: Dec. 23, 2023.

Response to Office Action 1 for U.S. Appl. No. 17/375,724, Date mailed: Mar. 22, 2023.

Office Action 2 for U.S. Appl. No. 17/375,724, Date mailed: May 2, 2023.

A. Irmanova, 0. Krestinskaya and A. P. James, "Neuromorphic Adaptive Edge-Preserving Denoising Filter," 2017 IEEE International Conference on Rebooting Computing (ICRC), 2017, pp. 1-6, doi: 10.11 09/ICRC.2017.8123644. (Year: 2017).

Benjamin et al. Neurogrid—A Mixed-Analog-Digital Multichip System for Large-Scale Neural Simulation, IEEE 2014 (Year: 2014).

Neuromorphic Computing with Intel's Loihi 2 chip—Technology Brief, 2021 (Year: 2021).

Response to Office Action 2 for U.S. Appl. No. 17/375,724, Date mailed: Aug. 1, 2023.

Notice of Allowance for U.S. Appl. No. 17/375,724, Date mailed: Aug. 21, 2023.

Office Action 1 for U.S. Appl. No. 17/369,742, Date mailed: Jan. 28, 2025.

Response to Office Action 1 for U.S. Appl. No. 17/369,742, Date mailed: Mar. 28, 2025.

Office Action 2 for U.S. Appl. No. 17/369,742, Date mailed: Jul. 7, 2025.

Office Action 1 for U.S. Appl. No. 17/375,655, Date mailed: Oct. 15, 2024.

Response to Office Action 1 for U.S. Appl. No. 17/375,655, Date mailed: Feb. 11, 2025.

Office Action 2 for U.S. Appl. No. 17/375,655, Date mailed: Apr. 9, 2025.

Yang et al., "Online Blind Complex Source Separation Algorithm with In-phase and Quadrature Component Joint Processing," 2016, 7th ISMS Conference.

Tan, et al., "Nonlinear Blind Source Separation Using a Radial Basis Function Network," 2001.

Zhau, et al., "Online Blind Source Separation Using Incremental Nonnegative Matrix Factorization with Volume Constraint," 2011.

(56)          References Cited

OTHER PUBLICATIONS

Response to Office Action 2 for U.S. Appl. No. 17/375,655, Date mailed: Jul. 1, 2025.

* cited by examiner

100

200

202

SYSTEM AND METHOD FOR REAL-TIME RADAR RANGE-DOPPLER MAP LEARNING

CROSS-REFERENCE TO RELATED APPLICATIONS

This application is a Continuation-in-Part application of U.S. Ser. No. 17/375,655, filed on Jul. 14, 2021, which is a non-provisional patent application of U.S. 63/051,763, filed on Jul. 14, 2020, and of U.S. 63/051,851, filed on Jul. 14, 2020, the entirety of which are hereby incorporated by reference.

This application is ALSO a Continuation-in-Part application of U.S. Ser. No. 17/375,724, filed on Jul. 14, 2021, which is a non-provisional patent application of U.S. 63/051,877, filed on Jul. 14, 2020, and of U.S. 63/051,851, filed on Jul. 14, 2020, the entirety of which are hereby incorporated by reference.

This application is ALSO a Continuation-in-Part application of U.S. Ser. No. 17/369,742, filed on Jul. 7, 2021, which is a non-provisional application of U.S. 63/051,368, filed on Jul. 13, 2020, and of U.S. 63/051,851, filed on Jul. 14, 2020, the entirety of which are hereby incorporated by reference.

BACKGROUND OF INVENTION

(1) Field of Invention

The present invention relates to a system for map learning and, more specifically, to a physics enhanced reservoir computer and associated method for real-time radar range-doppler map learning.

(2) Description of Related Art

Radar signal processing is a technique by which a system calculates from a received echo signal an evaluable image on the radar display. Current state of the art radar processing approaches include various forms of matched filtering combined with long coherent/incoherent pulse integration techniques. However, short pulse width and low signal-to-noise ratio (SNR) level in the radar return signals make these approaches less effective than desired since the usable detection range reduces rapidly. Thus, a continuing need exists for a system that overcomes these limitations by significantly improving the input SNR value for the receiver.

SUMMARY OF INVENTION

The present disclosure provides a system for real-time radar range-doppler map learning. The system includes a physics enhanced dynamic reservoir core operable for receiving as an input signal a time delayed copy of a transmitted complex in-phase and quadrature (I/Q) radar waveform, and mapping the input signal onto a neural network to determine complex-valued output weights of neural states of the neural network. An online learning layer is included that adapts the complex-valued output weights of the neural states to predict a most likely next value of the input signal, wherein the complex-valued output weights are continuously updated via a gradient descent online learning algorithm. A neural combiner is used to combine a set of delayed neural state vectors with the complex-valued output weights of the online learning layer to compute a denoised and decluttered output signal, the output signal being separate in-phase and quadrature signals.

Additionally, the gradient descent online learning algorithm includes both a prediction error and L2 and L1 norm penalty terms. The L2 norm penalty term forces values of the complex-valued output weights to maintain within predetermined bounding limits. Further, the L1 norm penalty term forces a learned weight matrix to a sparse solution that zeroes out noise generated false targets.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
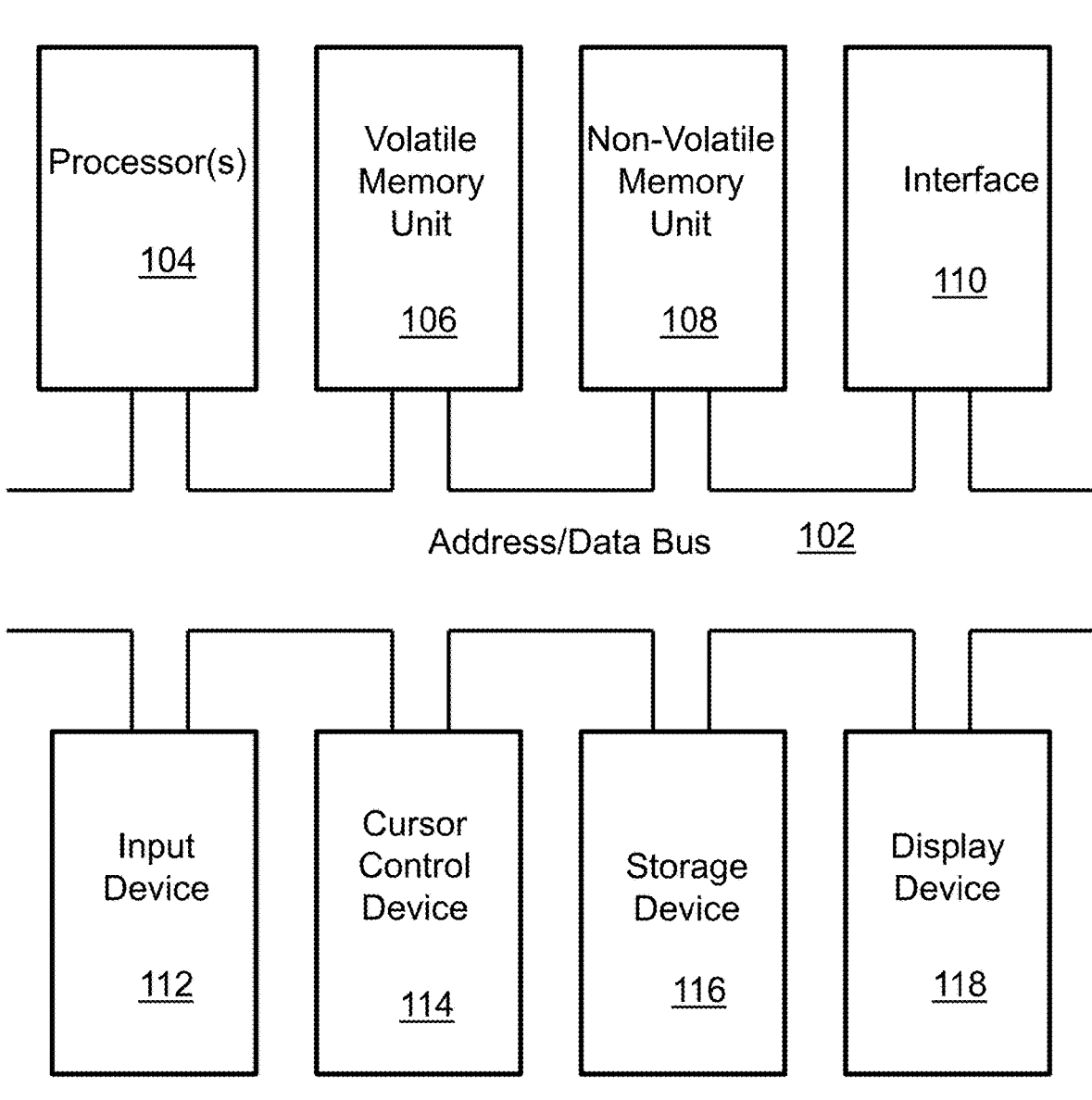
FIG. 1 is a block diagram depicting the components of a system according to various embodiments of the present invention.

The present invention relates to a system for map learning and, more specifically, to a physics enhanced reservoir computer and associated method for real-time radar range-doppler map learning. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112 (f). In particular, the use of "step of" or "act of" in the claims herein is not intended to invoke the provisions of 35 U.S.C. 112 (f).

Before describing the invention in detail, first a description of the various principal aspects of the present invention is provided. Subsequently, specific details of various embodiment of the present invention are provided to give an understanding of the specific aspects.

(1) Principal Aspects

Various embodiments of the invention include three "principal" aspects. The first is a system for real-time radar range-doppler map learning. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

As noted above, the invention can be applied to a variety of hardware implementations, including computer processing units (CPU), graphics processing units (GPU), and FPGA. For wideband processing FPGA is the desired option since it enables massively parallel implementation of the processing algorithm for both real and complex valued input signals. The inventors previously demonstrated 500 MHz instantaneous bandwidth (IBW) real-time signal de-nosing algorithm on FPGA. The same software-hardware co-design principles that are described in U.S. Ser. No. 17/375,655 and U.S. Ser. No. 17/375,724, can be implemented here.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
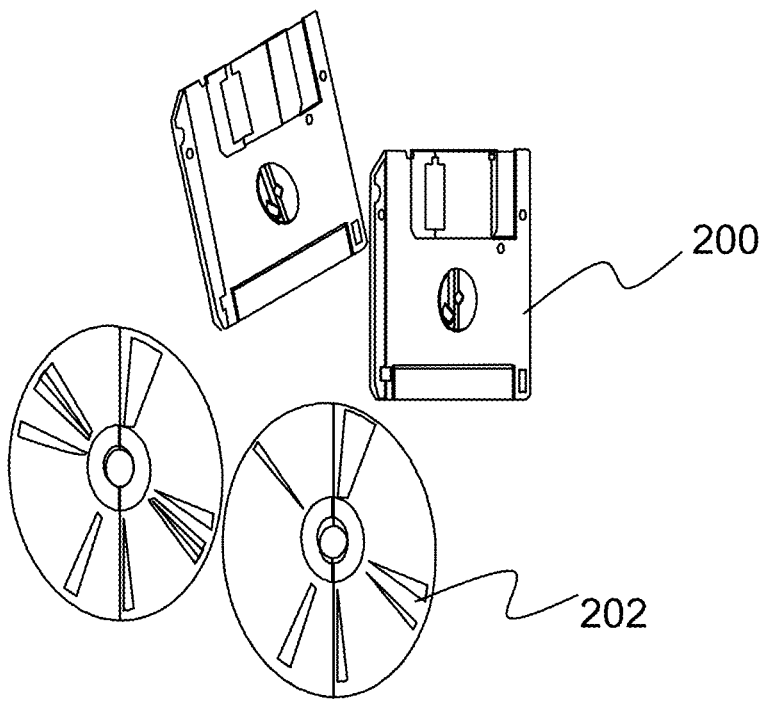
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

The present disclosure is directed to a system (i.e., with a physics enhanced reservoir computer) and associated method for real-time radar range-doppler map learning. The system incorporates a unique radar Machine Learning (ML) signal processing technology and hardware that can increase detection range and/or reduce power by at least a factor of two compared to current state-of the art, while also improving the SNR in the received signal. For example, the system provides a 10 dB signal-to-noise-ratio (SNR) improvement in received signal, resulting in a two-times (2×) increase in detection range or eight-times (8×) reduction in power. To provide such marked improvements over the prior art, the system uses (a) an advanced online learning based ML algorithm (complex reservoir computer) tailored to effectively generate range-doppler map in real-time, b) a radar specific reservoir design with user defined map resolution, c) real-time range-Doppler map learning via advanced online gradient descent algorithm, d) L1 norm penalization term to force sparse range-Doppler map during learning and e) effective clutter removal via simple weight matrix manipulation. Each of these aspects are described in turn below.

(2.1) Complex Reservoir Computer

Figure 3A:
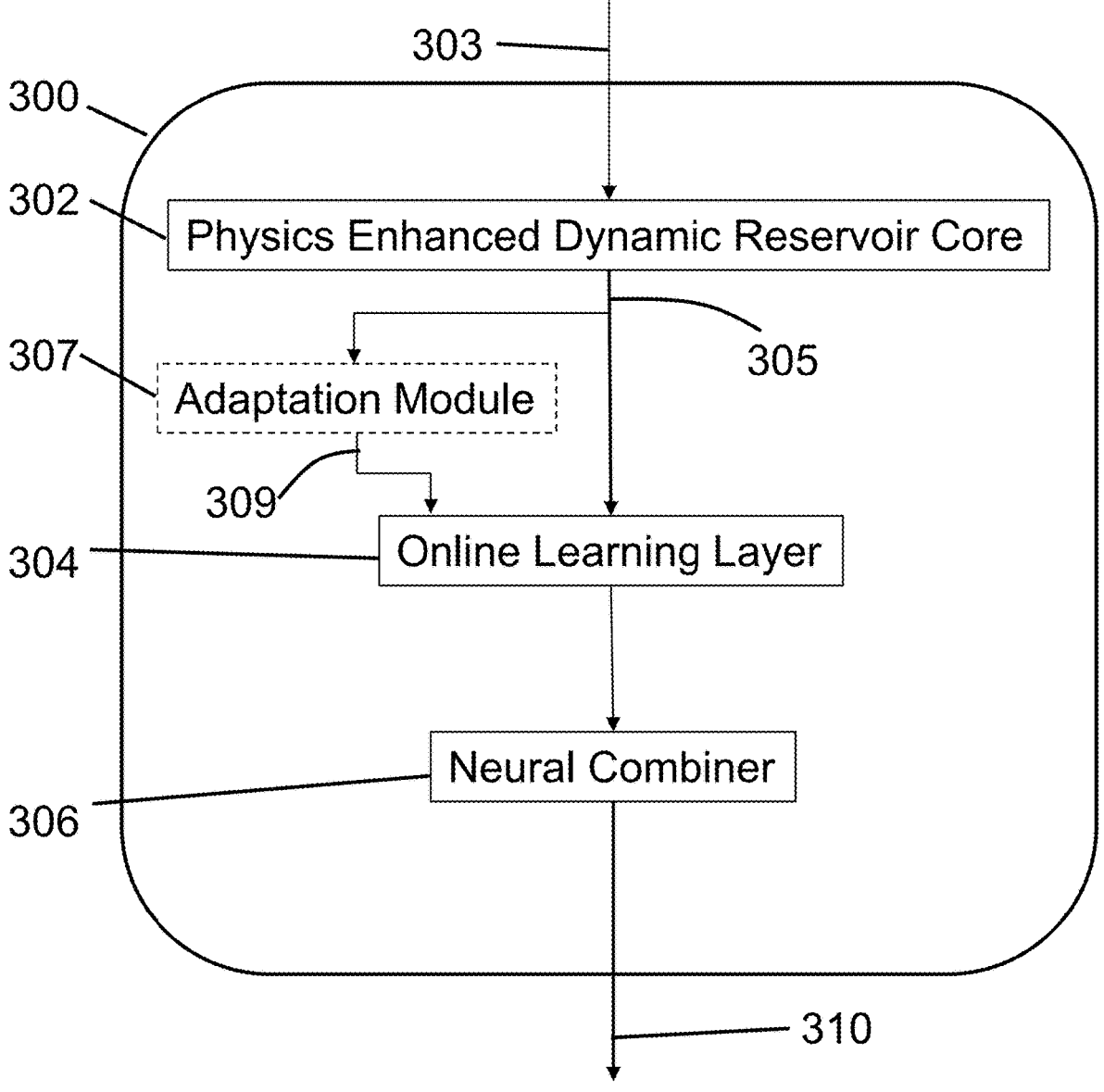
FIG. 3A is a flowchart of a "physics enhanced dynamic reservoir core" architecture according to various embodiments of the present invention.

The present disclosure provides an online learning based complex Reservoir Computer (RC) architecture that is tailored to effectively generate range-Doppler map in real-time. As shown in FIG. 3A, the RC architecture 300 includes three primary functional modules. The first primary block, referred to as a "physics enhanced dynamic reservoir core" 302, receives as input a time delayed copy of the transmitted complex in-phase and quadrature (I/Q) radar waveform 303. The reservoir core 302 generates time and frequency shifted versions 305 of the transmit waveform for further processing.

An optional adaptation module 307 can be turned on to make the core 302 adaptable in real time, transforming the time and frequency shifted versions 305 of the transmit waveform into more realistic received waveforms governed by physical constraints/models of the actual RF environment. There are many possible optional adaptation strategies for the core 302 weights. As a non-limiting example, the neural state space vector X captures in real time the spectrum of the input signal mixture, which can be used to adapt the frequencies of the poles to detect and track optimally the various signals in the input. More generally, both the frequency and tunable quality factor Q of each pole can be adapted based on the state space spectrum and other variables. Thus, in one aspect, the adaptation module 307 allows a user to adapt the frequency and tunable quality factor Q of each pole.

The second primary module, referred to as an "online learning layer" 304, is a short-time online learning engine that adapts the complex-valued output weights of the reservoir states to predict the most likely next value of the input signal. The online learning layer 304 also optionally embeds additional physical models into the RC 300. Examples of such embedding can be found in U.S. application Ser. No. 17/369,742, the entirety of which is incorporated herein by reference.

The third primary module, referred to as the "neural combiner" 306, combines a set of delayed neural state vectors with the weights of the online learning layer 304 to compute the output signal 310. The neural state vectors are combined with the weights using any suitable process, including the process as disclosed in U.S. application Ser. No. 17/369,742.

The disclosed architecture ensures that the learned output weights correspond to a radar range-Doppler map where, in addition to learning this map, enforces sparsity of the learned weights matrix via L1 norm penalization terms in the learning algorithm. Rapid learning is ensured by the physics enhanced reservoir core 302 since all the known information about the returned radar waveform (e.g., waveform shape, approximate time and frequency delay values) are incorporated into the core 302. The learning algorithm only learns the unknown parameters of the waveform (i.e., actual time and frequency delay values of the received waveform). The learning algorithm simultaneously eliminates most of the noise from the received waveform via its prediction capability.

In addition, the process forces a sparse solution for the learned weights matrix that helps in effectively eliminating noise generated false targets. The noise generated false targets are eliminated by the sparse solution zeroing out the false targets.

The architecture is also capable of removing clutter in real time by generating a second output where the weights matrix is pruned according to the latest known information about the clutter. The architecture can further be extended to perform multiple hypothesis testing on the clutter by providing multiple simultaneous pruned outputs.

(2.2) Radar Specific Reservoir

Figure 3B:
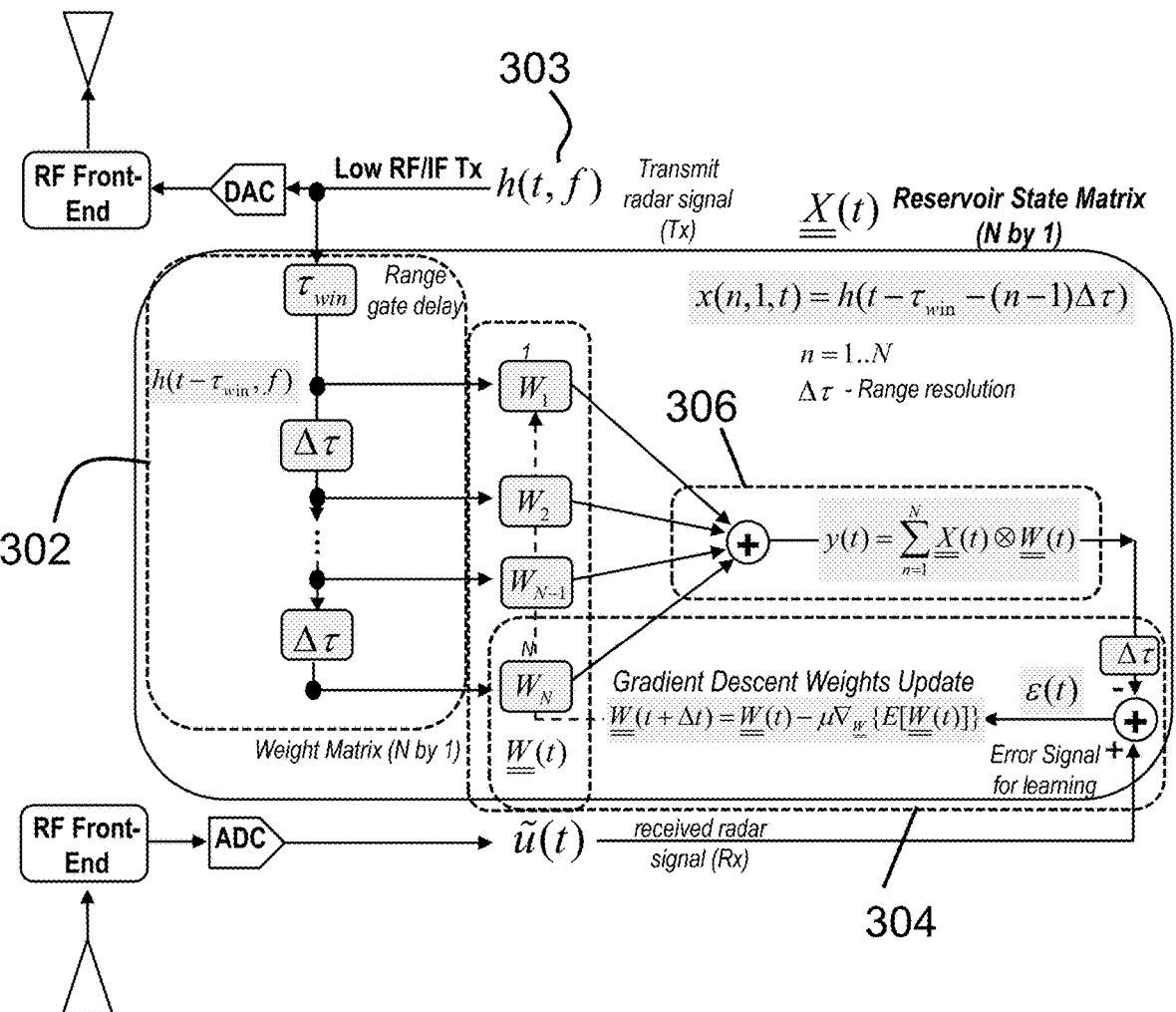
FIG. 3B is an illustration of a radar specific "physics enhanced dynamic reservoir core" architecture according to various embodiments of the present invention.

FIG. 3B provides an illustration depicting an example architecture of a radar specific "physics enhanced dynamic reservoir core" 302 that is operable for receiving as an input signal a time delayed copy of a transmitted complex in-phase and quadrature (I/Q) radar waveform and mapping the I/Q signals onto a neural network to determine complex-valued output weights of neural states of the neural network. The transmitted complex (I/Q) radar waveform 303 is delayed by a user defined minimum value and fed into the reservoir 302. The reservoir generates frequency and time shifted versions of this delayed transmit waveform that are being used in the learning process. The reservoir state outputs are each multiplied by a complex learned weight value to produce the predicted received waveform. With an assumed moderate positive signal-to-noise ratio (SNR) value for the received waveform, the learning algorithm rapidly converges to the significant weight values where the associated frequency and time delay values match to the received waveform. For all other nodes, that learned weight values remain small and ultimately will be zeroed out by the L1 norm penalization terms in the learning algorithm. Both the frequency and range resolutions are user-defined; however, the sampling clock frequency needs to be adjusted for the selected range resolution value.

(2.3) Real-Time Range-Doppler Map Learning

Figure 4:
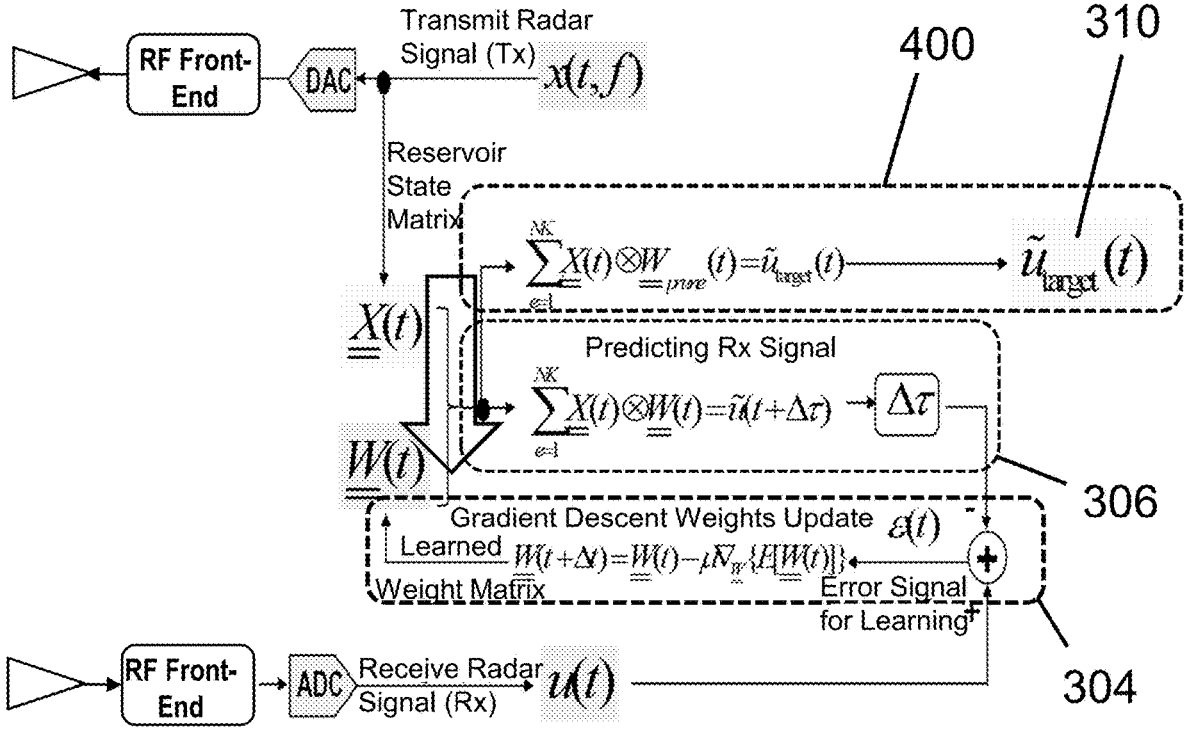
FIG. 4 is an illustration depicting an advanced online gradient descent algorithm for real-time range-Doppler map learning according to various embodiments of the present invention.

The general concept of the real-time range-Doppler map learning via advanced online gradient descent algorithm is shown in FIG. 4. The output weight values are continuously updated via a gradient descent online learning algorithm at the online learning layer 304. FIG. 4 shows the general form of the weights update equation, including the gradient of the quadratic energy function that includes both the prediction error and additional L2 and L1 norm penalty terms as incorporated into the online learning layer 304. The L2 penalty term forces the values of the learned weights to be small and by this ensures that the weights do not grow out of bound (i.e., out of a predetermined bounding limit). Ultimately, this term is translated into the "forgetting factor" of the learning algorithm that ensures that in the learning process some small fractions of the previously learned weights are "forgotten" before the next update cycle.

(2.4) L1 Norm Penalization Term

As an improvement over the prior art, the online learning layer 304 incorporates an L1 norm penalization term that forces the learned weight matrix to be sparse and ultimately eliminates most of the noise generated false targets.

The explicit forms of these terms are given in the equations below. The explicit forms of the weights update equations, including the gradient of the quadratic energy function that includes both the prediction error and L2 and L1 norm penalty terms, is provided as follows.

$$y(t) = \overset{\text{Output}}{\overset{NK}{\underset{e=1}{\sum}} \underline{X}(t) \otimes \underline{W}(t)} \quad \overset{\text{Weights Update}}{\underline{W}(t + \Delta t) = \underline{W}(t) - \mu \nabla_{\underline{W}} \{E[\underline{W}(t)]\}}$$

$$E\{\underline{W}_I, \underline{W}_Q\} = \overset{\text{Quadratic Predition Error}}{[u_1(t + \tau_p) - \underset{rows}{\sum} \underset{columns}{\sum} \{\underline{W}_I(t) \otimes \underline{X}_I(t) - \underline{W}_Q(t) \otimes \underline{X}_Q(t)\}]^2 +}$$

$$[u_Q(t + \tau_p) - \underset{rows}{\sum} \underset{columns}{\sum} \{\underline{W}_I(t) \otimes \underline{X}_Q(t) - \underline{W}_Q(t) \otimes \underline{X}_I(t)\}]^2 +$$

$$\lambda_2 \underset{rows}{\sum} \underset{columns}{\sum} \{\underline{W}_I(t) \otimes \underline{W}_I(t)\} + \lambda_2 - \underset{rows}{\sum} \underset{columns}{\sum} \{\underline{W}_Q(t) \otimes \underline{W}_Q(t)\} + \lambda_1 \underset{\text{L1 Norm of } W}{\|\underline{W}\|_1}$$

$$\underline{\underline{W}} = \underline{W}_I + i \cdot \underline{W}_Q$$

$$\underline{\underline{X}} = \underline{X}_f + i \cdot \underline{X}_Q$$

$$u = u_I + i \cdot u_Q$$

$$y = y_I + i \cdot y_Q$$

$\otimes$ −elementwise multiplication $$\nabla_{\underline{W}_I}[E] = -2\varepsilon_I(t + \tau_p)\underline{X}_I(t) - 2\varepsilon_Q(t + \tau_p)\underline{X}_Q(t) + 2\lambda_2\underline{W}_I(t) + \lambda_1 \frac{\underline{W}_I(t)}{|\underline{W}(t)|}$$

-continued $$\nabla_{\underline{\underline{W}}_Q}[E] = -2\varepsilon_I(t+\tau_p)\underline{X}_Q(t) - 2\varepsilon_Q(t+\tau_p)\underline{X}_I(t) + 2\lambda_2\underline{\underline{W}}_Q(t) + \lambda_1\frac{\underline{\underline{W}}_I(t)}{|\underline{\underline{W}}(t)|}$$

$$\frac{\underline{\underline{W}}}{|\underline{\underline{W}}|} = \begin{cases} \dfrac{W_{ij}}{W_{ij}} & \text{if } W_{ij} \neq 0 + i \cdot 0 \\ 0 & \text{if } W_{ij} = 0 + i \cdot 0 \end{cases}$$

As used herein, E denotes error, t denotes time, W denotes weight, I and Q denote channels, λ denotes parameter for forcing a condition, τ denotes delay, ε denotes error and μ denotes a learning parameter.

For F simplicity, separate update equations are provided for both real (I-channel) and imaginary (Q-channel) components of the weights. It is clearly visible on the equations that both I and Q channel weights and state functions are cross-coupled in order to compute the updated complex weight values.

The final forms of the complex weight update equations are shown in the equations below. In the final equations below, the user defined learning rate is called out separately, forgetting rate and L1 norm penalization rate parameters.

aspect, the system with the RC architecture 300 can be used for signal denoising to denoise noisy input signals 501. In some aspects, the RC architecture 300 can be used to control a device 502 based on the signal denoising (e.g., a mobile device display, a virtual reality display, an augmented reality display, a computer monitor, a motor, an autonomous vehicle, a machine, a drone, a camera, etc.). In some embodiments, the device 502 may be controlled to cause the device 502 to move or otherwise initiate a physical action based on the denoised signal.

In some embodiments, a drone or other autonomous vehicle may be controlled to move to an area where an object is determined to be based on the imagery. In yet some other embodiments, a camera may be controlled to orient $$y(t) = \sum_{e=1}^{NK}\underline{X}(t)\otimes\underline{\underline{W}}(t)$$

$$\nabla_{\underline{\underline{W}}_I}[E] = -2\varepsilon_I(t+\tau_p)\underline{X}_I(t) - 2\varepsilon_Q(t+\tau_p)\underline{X}_Q(t) + 2\lambda_2\underline{\underline{W}}_I(t) + \lambda_1\frac{\underline{\underline{W}}_I(t)}{|\underline{\underline{W}}(t)|}$$

$$\underline{\underline{W}}(t+\Delta t) = \underline{\underline{W}}(t) - \mu_{team}\nabla_{\underline{\underline{W}}}\{E[\underline{\underline{W}}(t)]\}$$

$$\nabla_{\underline{\underline{W}}_Q}[E] = +2\varepsilon_I(t+\tau_p)\underline{X}_Q(t) - 2\varepsilon_Q(t+\tau_p)\underline{X}_Q(t) + 2\lambda_2\underline{\underline{W}}_I(t) + \lambda_1\frac{\underline{\underline{W}}_Q(t)}{|\underline{\underline{W}}(t)|}$$

Weights Update Equations $$\underline{\underline{W}}_I(t+\Delta t) = (1-\mu_{forget})\underline{\underline{W}}_I(t) + \mu_{team}\varepsilon_I(t+\tau_p)\underline{X}_I(t) + \mu_{team}\varepsilon_Q(t+\tau_p)\underline{X}_Q(t) - \mu_{L1}\frac{\underline{\underline{W}}_I(t)}{|\underline{\underline{W}}(t)|}$$

$$\underline{\underline{W}}_Q(t+\Delta t) = (1-\mu_{forget})\underline{\underline{W}}_Q(t) + \mu_{team}\varepsilon_I(t+\tau_p)\underline{X}_Q(t) + \mu_{team}\varepsilon_Q(t+\tau_p)\underline{X}_I(t) - \mu_{L1}\frac{\underline{\underline{W}}_Q(t)}{|\underline{\underline{W}}(t)|}$$

where $$\varepsilon_I(t+\tau_p) - u_I(t+\tau_p) - y_I(t)$$

$$\varepsilon_Q(t+\tau_p) - u_Q(t+\tau_p) - y_Q(t)$$

After working in a feedback loop between the neural combiner 306 and online learning layer 304, the system generates as an output updated complex weights that can be used for further processing.

(2.5) Clutter Removal

The present disclosure also describes a system that enables effective clutter removal 400 via simple weight matrix manipulation to generate the decluttered and denoised signal 310. Clutter removal 400 is achieved in parallel with the online learning and denoising processes as shown in FIG. 4. The current weight matrix is pruned according to the latest available information about the clutter. For example, if it is assumed that the clutter is stationary and the target has a nonzero Doppler shift, then the corresponding rows in the weight matrix are zeroed out for producing the decluttered output. Similarly, if it's assumed that the clutter is located in a further distance than the target, then the corresponding columns in the weight matrix are zeroed out for producing the decluttered output.

(2.6) Control of a Device

Figure 5:
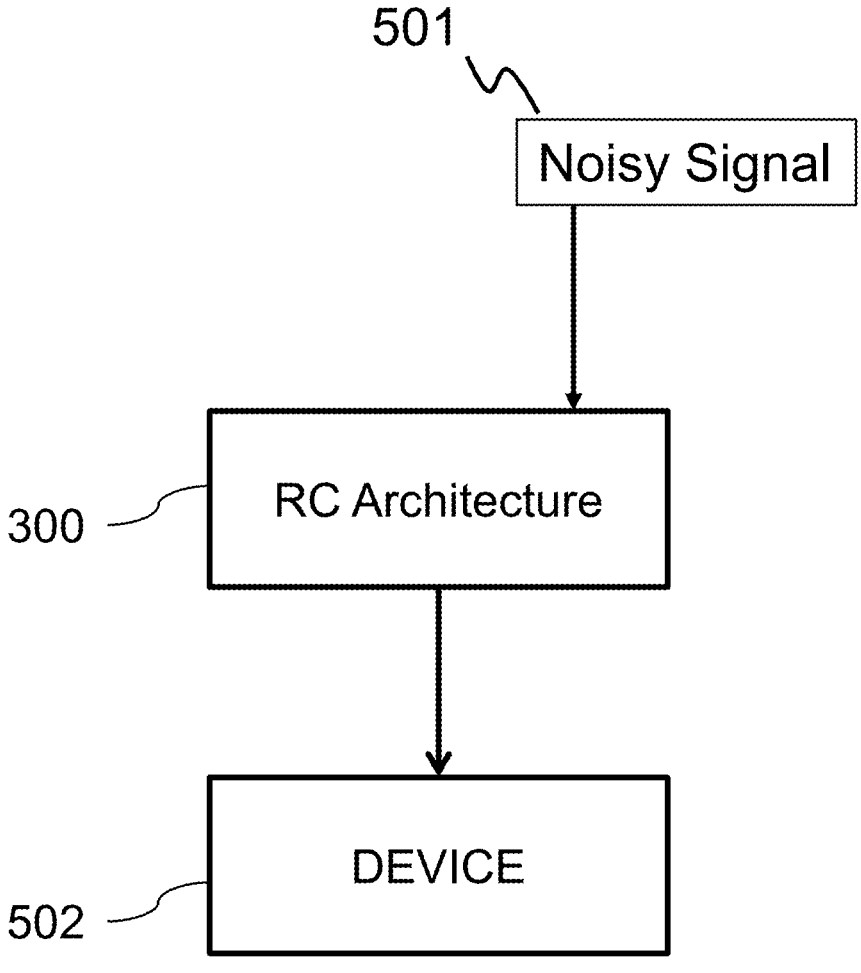
FIG. 5 is a block diagram depicting control of a device according to various embodiments.

As shown in FIG. 5, the RC architecture 300 in its hardware implementation has many applications. In one towards the identified object. In other words, actuators or motors are activated to cause the camera (or sensor) to move or zoom in on the location where the object is localized. In yet another aspect, if a system is seeking a particular object and if the object is not determined to be within the field-of-view of the camera, the camera can be caused to rotate or turn to view other areas within a scene until the sought after object is detected.

In addition, in a non-limiting example of an autonomous vehicle having multiple sensors, such as cameras, which might include noisy signals that need denoising. The system can denoise the signal and then, based on the signal, cause the autonomous vehicle to perform a vehicle operation. For instance, if two vehicle sensors detect the same object, object detection and classification accuracy is increased and the system described herein can cause a precise vehicle maneuver for collision avoidance by controlling a vehicle component. For example, if the object is a stop sign, the system may denoise a noisy input signal to identify the stop sign and then may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency. Non-limiting examples of devices that can be controlled via the system and associated RC architecture 300 include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for real-time radar range-doppler map learning, the system comprising:

a physics enhanced dynamic reservoir core operable for receiving as an input signal a time delayed copy of a transmitted complex in-phase and quadrature (I/Q) radar waveform, and mapping the input signal onto a neural network to determine complex-valued output weights of neural states of the neural network;

an online learning layer that adapts the complex-valued output weights of the neural states to predict a most likely next value of the input signal, wherein the complex-valued output weights are continuously updated via a gradient descent online learning algorithm;

a neural combiner for combining a set of delayed neural state vectors with the complex-valued output weights of the online learning layer to compute a denoised and decluttered output signal, the output signal being separate in-phase and quadrature signals.

2. The system as set forth in claim 1, wherein the gradient descent online learning algorithm includes both a prediction error and L2 and L1 norm penalty terms.

3. The system as set forth in claim 2, wherein the L2 norm penalty term forces values of the complex-valued output weights to maintain within predetermined bounding limits.

4. The system as set forth in claim 3, wherein the L1 norm penalty term forces a learned weight matrix to a sparse solution that zeroes out noise generated false targets.

5. A computer program product for real-time radar range-doppler map learning, the computer program product comprising:

a non-transitory computer-readable medium having executable instructions encoded thereon, such that upon execution of the instructions by one or more processors, the one or more processors perform operations of:

receiving as an input signal a time delayed copy of a transmitted complex in-phase and quadrature (I/Q) radar waveform;

mapping the input signal onto a neural network to determine complex-valued output weights of neural states of the neural network;

adapting the complex-valued output weights of the neural states to predict a most likely next value of the input signal, wherein the complex-valued output weights are continuously updated via a gradient descent online learning algorithm; and combining a set of delayed neural state vectors with the complex-valued output weights of the online learning layer to compute a denoised and decluttered output signal, the output signal being separate in-phase and quadrature signals.

6. The computer program product as set forth in claim 5, wherein the gradient descent online learning algorithm includes both a prediction error and L2 and L1 norm penalty terms.

7. The computer program product as set forth in claim 6, wherein the L2 norm penalty term forces values of the complex-valued output weights to maintain within predetermined bounding limits.

8. The computer program product as set forth in claim 6, wherein the L1 norm penalty term forces a learned weight matrix to a sparse solution that zeroes out noise generated false targets.

9. A computer implemented method for real-time radar range-doppler map learning, the method comprising an act of:

causing one or more processers to execute instructions encoded on a non-transitory computer-readable medium, such that upon execution, the one or more processors perform operations of:

receiving as an input signal a time delayed copy of a transmitted complex in-phase and quadrature (I/Q) radar waveform;

mapping the input signal onto a neural network to determine complex-valued output weights of neural states of the neural network;

adapting the complex-valued output weights of the neural states to predict a most likely next value of the input signal, wherein the complex-valued output weights are continuously updated via a gradient descent online learning algorithm; and combining a set of delayed neural state vectors with the complex-valued output weights of the online learning layer to compute a denoised and decluttered output signal, the output signal being separate in-phase and quadrature signals.

10. The method as set forth in claim 9, wherein the gradient descent online learning algorithm includes both a prediction error and L2 and L1 norm penalty terms.

11. The method as set forth in claim 10, wherein the L2 norm penalty term forces values of the complex-valued output weights to maintain within predetermined bounding limits.

12. The method as set forth in claim 10, wherein the L1 norm penalty term forces a learned weight matrix to a sparse solution that zeroes out noise generated false targets.

* * * * *